United States Patent
Nam et al.

(10) Patent No.: US 9,762,083 B2
(45) Date of Patent: Sep. 12, 2017

(54) WIRELESS CHARGING TRANSMITTER AND WIRELESS CHARGING SYSTEM USING THE SAME

(71) Applicant: Samsung Electro-Mechanics Co., Ltd., Suwon-Si (KR)

(72) Inventors: Isaac Nam, Suwon-Si (KR); Chul Gyun Park, Suwon-Si (KR); Chang Mok Han, Suwon-Si (KR); Jae Suk Sung, Suwon-Si (KR); Hyun Keun Lim, Suwon-Si (KR); Ki Won Chang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 225 days.

(21) Appl. No.: 14/711,903

(22) Filed: May 14, 2015

(65) Prior Publication Data
US 2015/0333562 A1     Nov. 19, 2015

(30) Foreign Application Priority Data

May 16, 2014  (KR) .................. 10-2014-0059265
Dec. 24, 2014  (KR) .................. 10-2014-0189109

(51) Int. Cl.
*H02J 7/00*     (2006.01)
*H01F 27/00*   (2006.01)
(Continued)

(52) U.S. Cl.
CPC .......... *H02J 7/025* (2013.01); *H01F 27/2871* (2013.01); *H01F 38/14* (2013.01);
(Continued)

(58) Field of Classification Search
CPC .......... H02J 7/025; H02J 7/0044; H02J 50/90; H02J 50/10; H01F 27/2871; H01F 38/14
(Continued)

(56) References Cited

U.S. PATENT DOCUMENTS 5,741,316 A * 4/1998 Chen .................... A61N 1/3787
                                                                    607/61
9,583,966 B2 * 2/2017 Kato .................... H02J 7/0044
(Continued)

FOREIGN PATENT DOCUMENTS

CN         101714768 A        5/2010
DE   10 2011 054 541 A1       4/2013
(Continued)

OTHER PUBLICATIONS

Budhia, Mickel, Grant Covic, and John T. Boys. "Design and optimization of circular magnetic structures for lumped inductive power transfer systems." Power Electronics, IEEE Transactions on 26.11 (2011): 3096-3108, Boston, Massachusetts, USA.
(Continued)

*Primary Examiner* — Phallaka Kik
(74) *Attorney, Agent, or Firm* — NSIP Law

(57) ABSTRACT

A wireless power transmitter is electromagnetically couple-able to a receiving coil of a wireless power receiver to provide power wirelessly and includes a substantially planar transmitting core. A transmitting coil has a plurality of windings and is disposed on a surface of the transmitting core. The transmitting core may extend beyond the transmitting coil in a planar direction.

23 Claims, 7 Drawing Sheets

(51) Int. Cl.
*H01F 38/14* (2006.01)
*H02J 7/02* (2016.01)
*H01F 27/28* (2006.01)
*H02J 50/10* (2016.01)
*H02J 50/90* (2016.01)

(52) U.S. Cl.
CPC ............ *H02J 7/0044* (2013.01); *H02J 50/10* (2016.02); *H02J 50/90* (2016.02)

(58) Field of Classification Search
USPC ........................................ 320/108, 110, 115
See application file for complete search history.

(56) References Cited

U.S. PATENT DOCUMENTS

| | | | | |
|---|---|---|---|---|
| 9,601,943 | B2* | 3/2017 | Partovi | H01F 5/003 |
| 9,628,707 | B2* | 4/2017 | Blum | H04N 5/23241 |
| 2008/0200219 | A1* | 8/2008 | Kondo | H04B 1/3883 |
| | | | | 455/573 |
| 2009/0096413 | A1* | 4/2009 | Partovi | H01F 5/003 |
| | | | | 320/108 |
| 2010/0164431 | A1* | 7/2010 | Sip | H02J 7/025 |
| | | | | 320/108 |
| 2010/0244582 | A1 | 9/2010 | Yoshikawa | |
| 2010/0309081 | A1* | 12/2010 | Kobayashi | G06K 7/10316 |
| | | | | 343/788 |
| 2012/0098486 | A1* | 4/2012 | Jung | H02J 7/025 |
| | | | | 320/108 |
| 2013/0015718 | A1* | 1/2013 | Jung | H04B 5/0037 |
| | | | | 307/104 |
| 2013/0328407 | A1 | 12/2013 | Shimura | |
| 2014/0035520 | A1* | 2/2014 | Nakayama | H02J 17/00 |
| | | | | 320/108 |
| 2014/0125140 | A1 | 5/2014 | Widmer et al. | |
| 2014/0191584 | A1* | 7/2014 | Kato | H02J 7/0044 |
| | | | | 307/104 |
| 2014/0265613 | A1* | 9/2014 | Jaskolski | H02J 17/00 |
| | | | | 307/104 |
| 2014/0327394 | A1 | 11/2014 | Asselin et al. | |
| 2015/0162120 | A1* | 6/2015 | Ren | H01F 38/14 |
| | | | | 307/104 |
| 2016/0056664 | A1* | 2/2016 | Partovi | H02J 7/025 |
| | | | | 307/104 |
| 2016/0294225 | A1* | 10/2016 | Blum | H02J 5/005 |

FOREIGN PATENT DOCUMENTS

| | | |
|---|---|---|
| EP | 1 484 816 A1 | 8/2004 |
| JP | 2013-197141 A | 9/2013 |
| KR | 10-2013-0008972 A | 1/2013 |
| KR | 10-2013-0098828 A | 9/2013 |
| KR | 10-1394507 B1 | 5/2014 |

OTHER PUBLICATIONS

Extended European Search Report issue Nov. 3, 2015 in counterpart European Application No. 15167458.7 (9 pages in English).

Chinese Office Action issued on Feb. 20, 2017 in counterpart Chinese Patent Application No. 201510253217.8 (18 pages, with English translation).

* cited by examiner

WIRELESS CHARGING TRANSMITTER AND WIRELESS CHARGING SYSTEM
USING THE SAME

CROSS-REFERENCE TO RELATED APPLICATIONS

This application claims priority to, and the benefit of, Korean Patent Application Nos. 10-2014-0059265 filed on May 16, 2014 and 10-2014-0189109 filed on Dec. 24, 2014, with the Korean Intellectual Property Office, the disclosures of which are incorporated herein by reference for all purposes.

BACKGROUND

The present disclosure relates to a wireless charging transmitter and a wireless charging system using the same.

In accordance with the development of wireless technology, various wireless functions, from data transmission to power transmission, have become available. A wireless charging method for charging various portable apparatuses in a non-contact manner has gained prominence.

In a wireless power transmitting technology according to the related art, a number of limitations on smoothly performing charging are present. That is, in transmitting and receiving power wirelessly, restrictions, such as a limited transmission distance, and a restrictive positional relationship between a transmitter and a receiver, are present. Therefore, limitations in which wireless power charging may only be performed if a wireless power receiver is positioned in a specific position or in a specific direction with respect to a wireless power transmitter may be present.

Meanwhile, wireless power transfer technology has been applied to various portable apparatuses. Therefore, there is a demand for wireless power charging technology allowing charging to be efficiently performed in a range of environments.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect a wireless charging transmitter capable of efficiently transmitting power wirelessly even in a case in which a transmitting coil and a receiving coil form various angles with respect to each other, and a wireless charging system using the same are provided.

According to a general aspect of the present disclosure, a wireless power transmitter is electromagnetically coupleable to a receiving coil of a wireless power receiver to provide power wirelessly. The wireless power transmitter includes a transmitting core being substantially planar, and a transmitting coil having a plurality of windings and being disposed on a face of the transmitting core, wherein the transmitting core extends beyond the transmitting coil in the planar direction.

The transmitting core may be selectively sized according to a distance, and/or an angle, and/or a magnetic distance between the transmitting coil and the receiving coil when the receiving coil is positioned above the transmitting coil at a predetermined angle with the transmitting coil, and combinations thereof.

The transmitting core may include a body portion corresponding to a size of the transmitting coil and having the transmitting coil fixed to the body portion; and an extension portion formed to extend from the body portion by a predetermined length.

The predetermined length of the extension portion may be established according to a shortest distance from the transmitting coil to the receiving coil.

The predetermined length of the extension portion may be shorter than a distance from a virtual magnetic average line of the transmitting coil to a center point of the receiving coil in a direction perpendicular with respect to the virtual magnetic average line.

The transmitting coil may be wound in a plurality of layers, and the predetermined length of the extension portion is shorter than a distance from half of an overall height of the transmitting coil to a center point of the receiving coil in a direction perpendicular with respect to the transmitting coil.

The extension portion may extend so that a distance from a virtual magnetic average line of the transmitting coil to a center point of the receiving coil in a direction perpendicular with respect to the virtual magnetic average line is substantially the same as a length from a center of the transmitting coil to an end of the extension portion.

The transmitting core may be formed so that a distance from a virtual magnetic average line of the transmitting coil to a center point of the receiving coil in a direction perpendicular with respect to the virtual magnetic average line substantially corresponds to a radial length from a center of the transmitting coil to an end of the transmitting core.

The transmitting coil may be wound in a plurality of layers, and the transmitting core may be formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

The transmitting core may be formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

The transmitting core may be formed so that an angle formed by a center point of the receiving coil and an extended line of a virtual magnetic average line of the transmitting coil is less than 45°.

The wireless power transmitter may further include a housing including the transmitting coil and the transmitting core, wherein the housing further includes a marking portion indicating a mounting position of a portable apparatus including the wireless power receiver.

The marking portion may be marked so that the receiving coil is positioned above the transmitting coil.

The transmitting core may be plate shaped and the transmitting coil may be affixed to an upper surface of the transmitting core.

According to another general aspect, a wireless charging system includes a wireless power transmitter including a transmitting coil and a transmitting core on which the transmitting coil is disposed; and a wireless power receiver including a receiving coil forming a predetermined nonzero angle with respect to the transmitting coil, wherein the transmitting core is selectively sized according to the angle, a distance, and/or a magnetic distance between the receiving coil and the transmitting coil.

The transmitting core may include: a body portion corresponding to a size of the transmitting coil and having the transmitting coil fixed to the body portion; and an extension portion which may be formed to extend from the body portion by a predetermined length.

The predetermined length of the extension portion may be established according to a distance from the transmitting coil to the receiving coil.

The extension portion may extends so that a distance from a virtual magnetic average line of the transmitting coil to a center point of the receiving coil in a direction perpendicular with respect to the virtual magnetic average line is substantially the same as a length from a center of the transmitting coil to an end of the extension portion.

The transmitting core may be formed so that a distance from a virtual magnetic average line of the transmitting coil to a center point of the receiving coil in a direction perpendicular with respect to the virtual magnetic average line corresponds to a length from a center of the transmitting coil to an end of the transmitting core.

The transmitting coil may be wound in a plurality of layers, and the transmitting core may be formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

The transmitting core may be formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

The transmitting core may be formed so that an angle formed by a center point of the receiving coil and an extended line of a virtual magnetic average line of the transmitting coil is less than 45°.

The transmitting coil and receiving coil may be disposed substantially transverse one to another.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
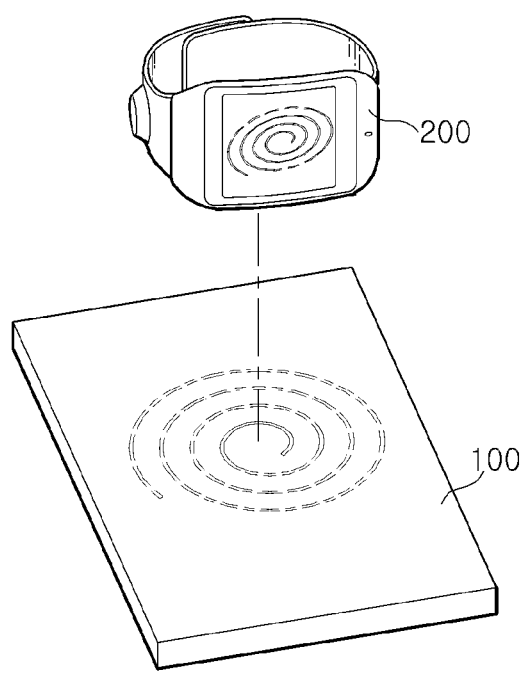
FIG. 1 is a diagram illustrating an example of an application to which a wireless charging system according to an exemplary embodiment in the present disclosure is applied.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

While the following detailed description is provided to assist the reader in gaining a comprehensive understanding of the methods, apparatuses, and/or systems described herein, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness. The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of an application of a wireless charging system according to an exemplary embodiment in the present disclosure.

As illustrated in FIG. 1, a wireless charging system may include a wireless power transmitter 100 and a wireless power receiver 200.

The wireless power transmitter 100 may transmit power wirelessly from an external voltage input.

The wireless power receiver 200 supplies power to a portable apparatus by receiving power provided wirelessly from the wireless power transmitter 100. Although the portable apparatus is illustrated as a watch-type wearable device in FIG. 1, the wireless power receiver 200 may be applied to other portable apparatuses.

The wireless power receiver 200 may be positioned at various angles with respect to the wireless power transmitter 100. In the case of a wireless power charging system according to the related art, charging may only be smoothly performed in a state in which the wireless power transmitter 100 and the wireless power receiver 200 are parallel with respect to each other. In other words, the transmission and reception coils in the related art generally had to be substantially co-axially disposed. However, in the case of the wireless charging system according to the exemplary embodiment in the present disclosure, wireless power transmission may be smoothly undertaken, even in a case in which the wireless power receiver 200 and the wireless power transmitter 100 are not parallel to each other, for example, even when an angle of 90° is maintained as in the illustrated example.

Hereinafter, a case in which the wireless power receiver 200 and the wireless power transmitter 100 are disposed to be perpendicular with respect to each other will be described by way of example, but it will be apparent that the following exemplary embodiments may be applied even at various angles at which the wireless power receiver 200 and the wireless power transmitter 100 are not perpendicular with respect to each other.

Figure 2:
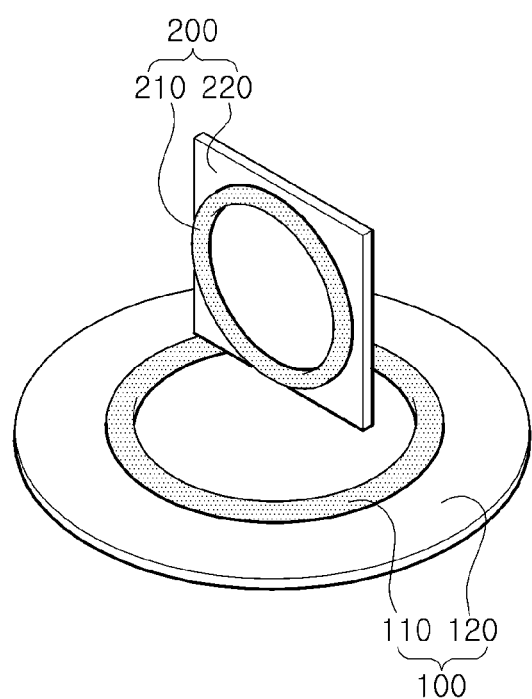
FIG. 2 is a perspective view illustrating an exemplary state in which a wireless power transmitter and a wireless power receiver are disposed to be perpendicular with respect to each other.

FIG. 2 is a perspective view illustrating a state in which the wireless power transmitter 100 and the wireless power receiver 200 are disposed to be perpendicular with respect to each other.

Figure 3:
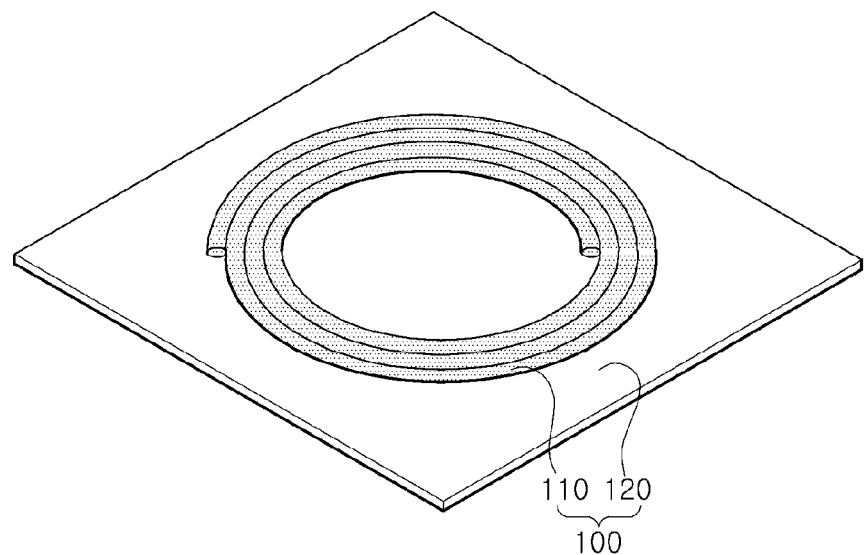
FIG. 3 is a diagram illustrating an exemplary transmission/reception coil.
Figure 6:
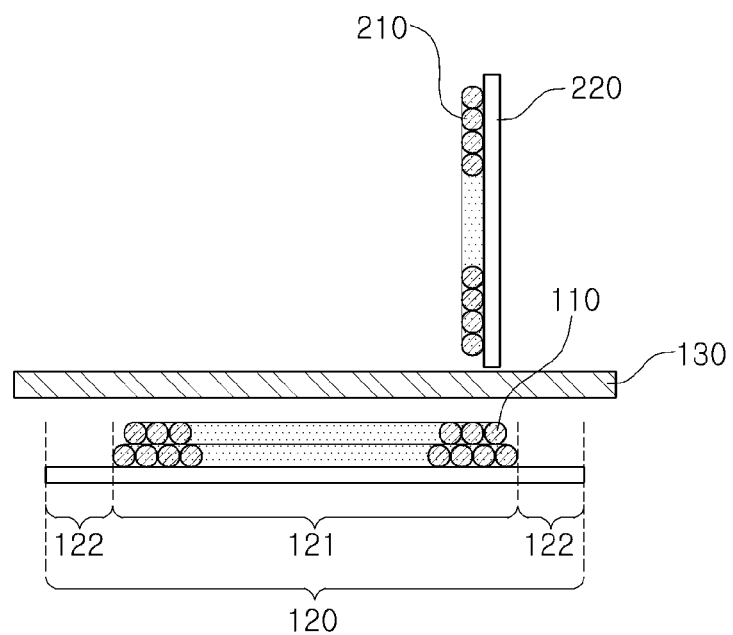
FIGS. 6 through 12 are cross-sectional views illustrating an exemplary wireless charging system.

The wireless power transmitter 100 may include a transmitting coil 110 and a transmitting core 120. While the transmitting coil 110 is illustrated as a single loop in FIG. 2, this is for convenience of explanation. For example, the transmitting coil 110 may have a plurality of windings in a spiral shape as illustrated in FIG. 3. Alternatively, the transmitting coil 110 may be formed as windings in a plurality of layers as illustrated in FIG. 6.

The transmitting coil 110 transmits power wirelessly. For example, the transmitting coil 110 may transmit power in an electromagnetic resonance mode. According to an exemplary embodiment in the present disclosure, the transmitting coil 110 may have a value of about 10 μH or less at a frequency of about 6.78 MHz. The transmitting coil 110 may have a substantially spiral shape or a substantially helical shape, and in a case in which the transmitting coil 110 has the spiral shape, an internal diameter may be greater than about 2 cm.

The transmitting core 120 may be configured of a substrate or a magnetic transmitting core. The magnetic transmitting core may be formed of a material having a predetermined degree of magnetism such as a high degree of permeability. For example, the magnetic transmitting core may be formed of a resin material including a metal powder. As another example, the magnetic transmitting core may be configured of a ferrite sheet (which may include a NiZnCu/MnZn based metal), a sendust-based metal, a permalloy-based metal, an amorphous-based magnetic substance, or combinations thereof. While the word core is employed herein, the high permeability member need not necessarily be disposed within the inside of the coil 110.

The transmitting core 120 may be configured of a printed circuit board (PCB), a shielding sheet having an electromagnetic shielding function, a magnetic core, or the like. For example, when the transmitting core 120 is configured on the PCB, the transmitting coil 110 may be formed as a PCB pattern on the PCB such as by etching, lithography, chemical vapor deposition, additive or subtractive processes, or the like. In addition, in order to form the transmitting coil 110 to have a plurality of layers, the PCB, which is the transmitting core 120, may also be formed in the plurality of layers. The PCBs may employ through substrate vias (TSVs) or the like to interconnect the plurality of layers.

The wireless power receiver 200 may also include a receiving coil 210 and a receiving core 220. In addition, as described above, the wireless power receiver 200 may also be configured of the receiving coil 210 having various shapes and the receiving core 220 formed using various materials.

Figure 4:
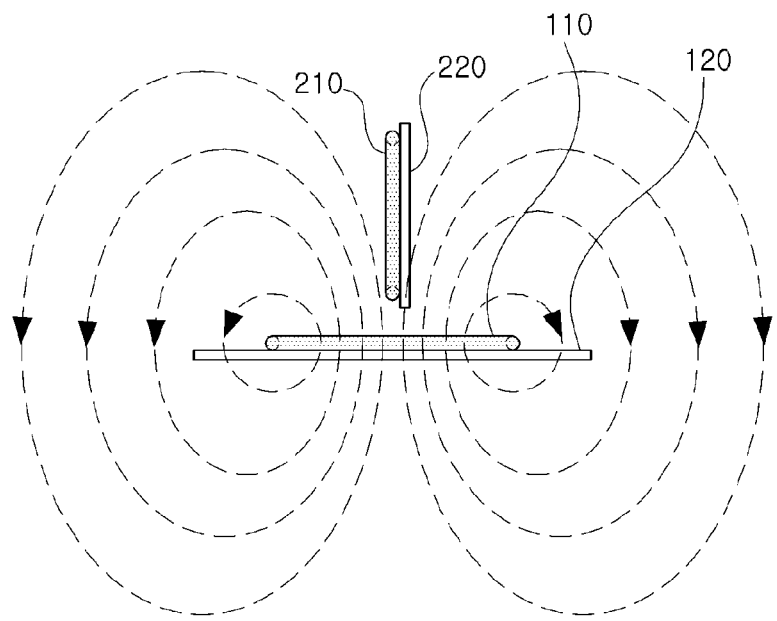
FIGS. 4 and 5 illustrate a magnetic coupling depending on positions of the wireless power receiver and the wireless power transmitter.

FIGS. 2 and 4 illustrate examples in which the wireless power receiver 200 is disposed in the center of the wireless power transmitter 100.

In FIG. 4, a dotted line indicates a virtual magnetic field transmitted from the wireless power transmitter 100, and in the case in which the wireless power receiver 200 is disposed as illustrated in FIGS. 2 and 4, the transmitted magnetic field may be parallel with respect to the wireless power receiver 200 or may have a slight gradient with respect thereto. Therefore, the transmitted magnetic field may not be substantially magnetically coupled to or only be very weakly coupled to the receiving coil 210 of the wireless power receiver 200.

Figure 5:
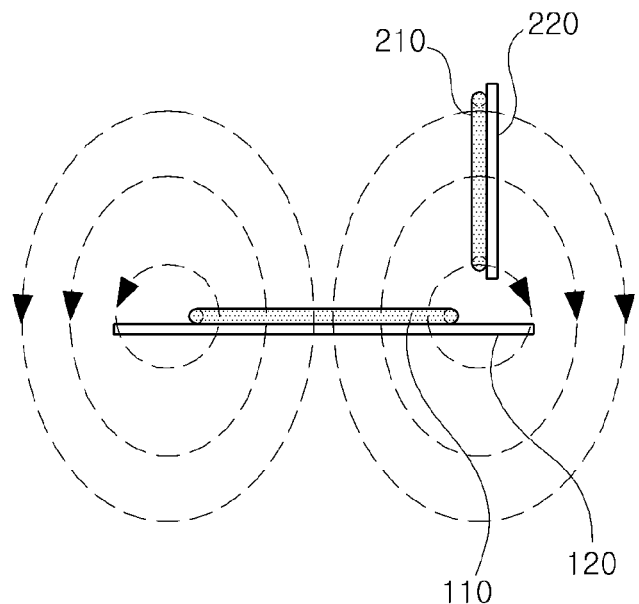

FIG. 5 illustrates an example in which the wireless power receiver 200 is disposed substantially on or above the transmitting coil (removed from the central portion) of the wireless power transmitter 100.

In this case, since the magnetic field transmitted from the wireless power transmitter 100 forms a type of loop as illustrated, a greater amount of flux may pass through the receiving coil 210 of the wireless power receiver 200 when the wireless power receiver 200 is disposed on the transmitting coil of the wireless power transmitter 100. Therefore, the magnetic coupling between the transmitting coil 110 of the wireless power transmitter 100 and the receiving coil 210 of the wireless power receiver 200 in FIG. 5 may be stronger.

However, even in the case of the example illustrated in FIG. 5, since strength and efficiency of the magnetic coupling are in a relatively low state, it may be difficult to achieve efficient wireless charging in the case of the example illustrated in FIG. 5.

FIG. 6 is a cross-sectional view illustrating a wireless charging system according to an exemplary embodiment in the present disclosure.

According to an exemplary embodiment in the present disclosure, the transmitting coil 110 of the wireless power transmitter is formed to have a plurality of windings. For example, as illustrated in FIG. 6, the transmitting coil 110 is wound in a plurality of winding layers. In the case in which the transmitting coil 110 is wound with the plurality of layers, the strength of flux transmitted from the transmitting coil 110 is increased, and verticality (or distance) of the magnetic field may also be increased in terms of strength or magnitude. Therefore, strength of the magnetic coupling between the transmitting coil 110 wound in the plurality of layers and the receiving coil 210 may be increased.

According to an exemplary embodiment in the present disclosure, the wireless power transmitter 100 transmits power wirelessly in a magnetic resonance mode through the transmitting coil 110. In this case, the transmitting coil 110 has a value of about 10 μH or less at a frequency of about 6.78 MHz.

According to an exemplary embodiment in the present disclosure, the transmitting coil 110 may be wound in a spiral shape or a helical shape. As an example, when the transmitting coil 110 is wound in the spiral shape, a size of an internal diameter is greater than about 20 mm. When the size of the internal diameter is increased, a degree of freedom of an arrangement of the wireless power receiver 200 may be improved. A size of an external diameter of the transmitting coil 110 may be larger than about 45 mm.

According to an exemplary embodiment in the present disclosure illustrated in FIG. 6, the transmitting core 120 is larger than the transmitting coil 110. For example, the transmitting core 120 is longer than the transmitting coil 110 (e.g., an external diameter of the transmitting coil 110 in a case in which the transmitting coil 110 is wound in a circular form). The transmitting core 120 may be the magnetic transmitting core as described above, and the transmitting core 120 may serve to attract the magnetic field transmitted from the transmitting coil 110.

For example, the transmitting core 120 may reinduce the magnetic field transmitted from the transmitting coil 110 toward the transmitting coil 110. On the other hand, in a case in which the transmitting core 120 is formed to be larger than the transmitting coil 110, the magnetic field transmitted from the transmitting coil 110 may be reinduced more strongly. The transmitting core 120 may induce magnetic circulation by inducing the magnetic field transmitted from the transmitting coil 110 so that the magnetic field transmitted from the transmitting coil 110 loops back to the transmitting coil 110.

According to an exemplary embodiment in the present disclosure, the transmitting core 120 includes a body portion 121 and an extension portion 122. The body portion 121, which corresponds to the size of the transmitting coil 110, refers to a part to which the transmitting coil 110 is affixed. The extension portion 122 refers to a part formed to be extended from the body portion 121 by a predetermined length. Here, the body portion 121 and the extension portion 122 are separately described, but the body portion 121 and the extension portion 122 may or may not have properties different from each other. For example, the transmitting core 120 may also be physically implemented as a single material, a single feature, or a single shape.

An effect of the magnetic coupling may be varied depending on the length or width of the transmitting core 120. Therefore, according to various exemplary embodiments of the present disclosure, more effective magnetic coupling may be provided even at various other angles by adjusting the length of the transmitting core 120, for example, a length of the extension portion 122.

According to an exemplary embodiment in the present disclosure, when the receiving coil 210 is positioned above the transmitting coil 110 at a predetermined angle relative to the transmitting coil, the size of the transmitting core 120 may be determined using at least one of a distance, an angle, or a magnetic distance between the transmitting coil 110 and the receiving coil 210.

Various exemplary embodiments of the transmitting core 120 will be described below in more detail with reference to FIGS. 7 through 12.

Figure 7:
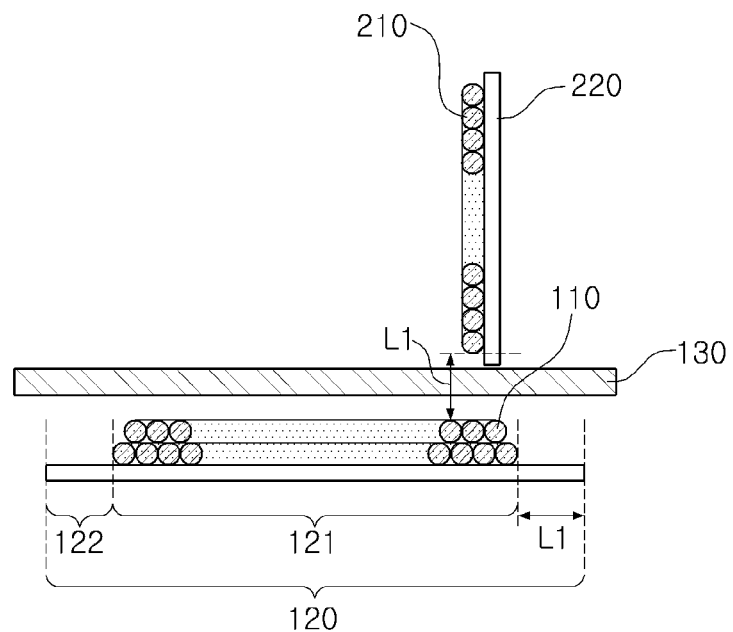

FIG. 7 is a cross-sectional view illustrating an example of the wireless charging system according to an exemplary embodiment in the present disclosure.

Referring to FIG. 7, in the case of the transmitting core 120, a shortest distance L1 from the transmitting coil 110 thereof to the receiving coil 210 may be provided as a minimum length of the extension portion 122. In a case of the example described above, the size of the wireless power transmitter 100 may be reduced by forming the length of the extension portion 122 to be relatively small.

According to another exemplary embodiment in the present disclosure, the transmitting core 120, a shortest distance (not shown) from a magnetic average point of the transmitting coil 110 to the receiving coil 210 may be provided as the minimum length of the extension portion 122.

According to an exemplary embodiment in the present disclosure, the extended distances L1, L2 of the transmitting core 120 may be determined using the length or width of the receiving coil 210. For example, when the receiving coil 210 is vertically positioned above the transmitting coil 110 of the wireless power transmitter 100, the extended distance of the transmitting core 120 may be determined to be proportional to a length of a radius of the receiving coil 210.

Figure 8:
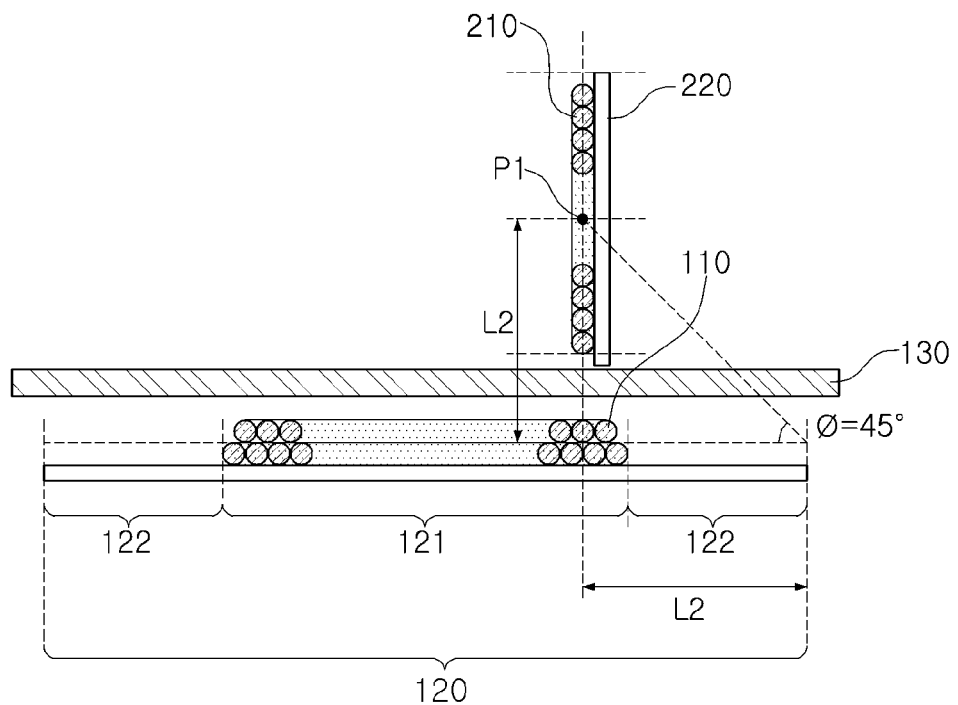

FIG. 8 is a cross-sectional view illustrating another example of the wireless charging system according to an exemplary embodiment in the present disclosure.

Referring to FIG. 8, the transmitting core 120 may be formed so that a distance L2 from a virtual magnetic average line of the transmitting coil 110 to a center point P1 of the receiving coil 210 in a direction perpendicular with respect to the virtual magnetic average line corresponds to a distance L2 from a center of a width of the transmitting coil to an end of the transmitting core.

Figure 9A:
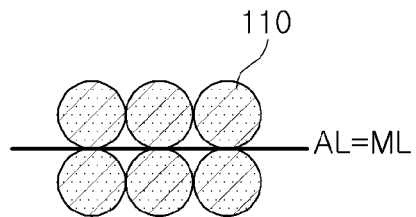
Figure 9B:
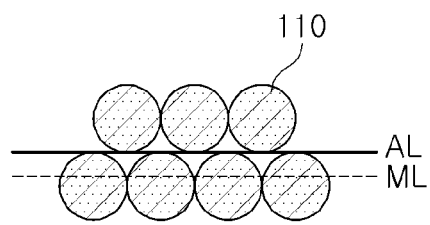

Here, the virtual magnetic average line of the transmitting coil 110 refers to a height of a magnetic average in the transmitting coils stacked in a plurality of layers. FIGS. 9A and 9B illustrate examples of the virtual magnetic average line ML.

FIGS. 9A and 9B illustrate the transmitting coils 110 stacked in two layers, wherein FIG. 9A illustrates an example in which the number of windings of upper and lower layers are the same as each other and FIG. 9B illustrates an example in which the number of windings of the upper and lower layers are different from each other.

In the case of FIG. 9A, since the transmitting coils 110 are configured with two layers, it may be appreciated that the virtual magnetic average line of the transmitting coil 110 is in the middle between the two layers. Therefore, a virtual line, which corresponds to half of the overall height of the transmitting coil 110, and the virtual magnetic average line of the transmitting coil 110 are the same as each other in the middle of the two layers. Therefore, in a case in which the transmitting coil 110 is configured of n layers having the same number of windings, the magnetic average point of the transmitting coil 110 may become a point of n/2 layers.

In the case of FIG. 9B, since the transmitting coil 110 is configured with two asymmetrically sized layers, the virtual line which corresponds to half of the overall height is the virtual middle line (AL) of the two layers, but it may be appreciated that the virtual magnetic average line (ML) is moved slightly downward of the middle, for example, moved toward a layer having a greater number of windings proportionately with the number of such windings relative to the windings in the other layers.

Although the virtual magnetic average line is used as a reference of determining the distance in the exemplary embodiments described above, half of the overall height of the transmitting coil 110 may be used as the reference for determining the distance depending on exemplary embodiments. For example, the length L2 from the center of the width of the transmitting coil 110 to the end of the transmitting core 120 may be formed to be smaller than a length corresponding to a distance from the half of the overall height of the transmitting coil 110 to the center point P1 of the receiving coil 210. The reason is that when a difference of the number of windings is not relatively large, this is merely a minute difference.

According to an exemplary embodiment in the present disclosure, as illustrated in FIG. 8, the length of the extension portion 122 may be shorter than the distance L2 from the virtual magnetic average line of the transmitting coil 110 to the center point P1 of the receiving coil 210 in a direction perpendicular with respect to the virtual magnetic average line ML. The reason is that the extension portion 122 starts from the external diameter of the transmitting coil 110 to an end of the transmitting core 120, but the distance L2 from the virtual magnetic average line to the center point P1 of the receiving coil 210 is calculated from a point on the virtual line vertically passing through center point P1 of the receiving coil 210.

According to an exemplary embodiment in the present disclosure, the length of the extension portion 122 is shorter than the distance from a point in a position equal to half of the overall height of the transmitting coil to the center point of the receiving coil.

According to an exemplary embodiment in the present disclosure, the transmitting core 120 is formed so that an angle formed by the center point P1 of the receiving coil 210 and the extended line of the virtual magnetic average line of the transmitting coil 110 with respect to the end of the transmission core 120 is less than about 45°. For example, although the angle formed by the center point P1 of the receiving coil 210 and the extended line of the virtual magnetic average line of the transmitting coil 110 is illustrated as being 45° in the example illustrated in FIG. 8, this case may be a maximum size of the transmitting core 120.

According to an exemplary embodiment in the present disclosure, the transmitting core 120 may be formed so that the distance from the virtual magnetic average line of the transmitting coil 110 to the center point P1 of the receiving coil 210 in a direction perpendicular with respect to the virtual magnetic average line corresponds to the length L2 from the center of the width of the transmitting coil to the end of the transmitting core.

According to an exemplary embodiment in the present disclosure, the transmitting core 120 may be formed so that the distance from a point at the center of the transmitting coil 110 to the end of the transmitting core 120 is shorter than the distance from the virtual magnetic average line of the transmitting coil 110 to the point at the center of the receiving coil 210 in a direction perpendicular with respect to the virtual magnetic average line.

Since the length L2 of the transmitting core 120 is determined depending on the angle formed by the center point P1 of the receiving coil 210 and the extended line of the magnetic average point of the transmitting coil 110, it may be appreciated that when the angle is larger than about 45°, the length of the transmitting core 120 becomes shorter than the illustrated example, and when the angle is smaller than about 45°, the length of the transmitting core 120 becomes longer than the illustrated example.

Figure 10:
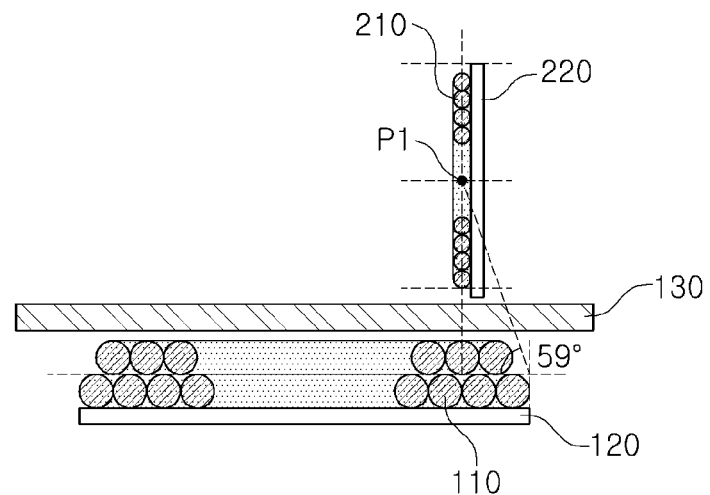
Figure 11:
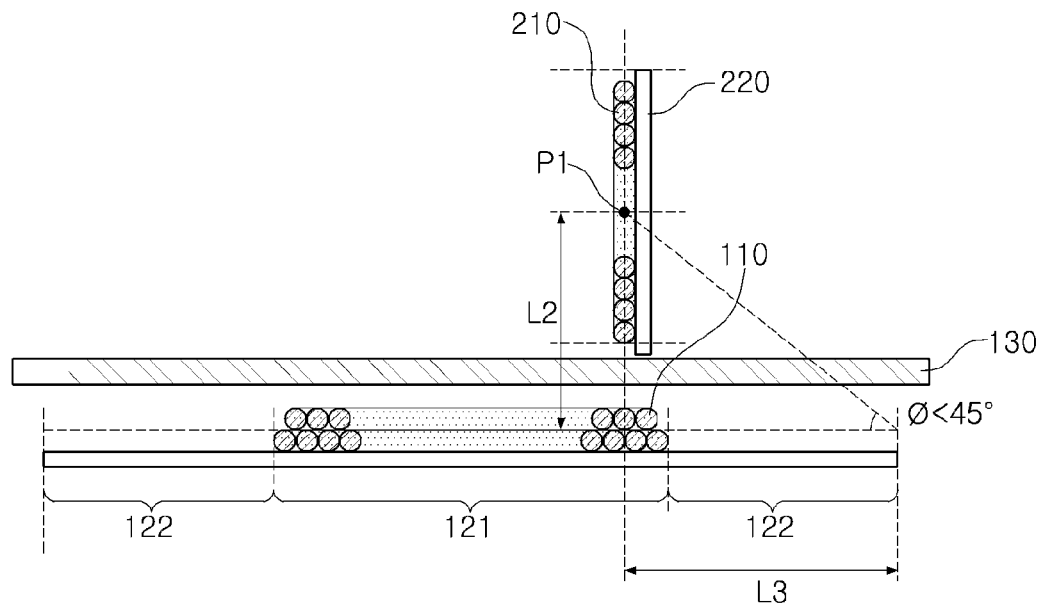

FIG. 10 illustrates an example in which the angle formed by the center point P1 of the receiving coil 210 and the extended line of the magnetic average point of the transmitting coil 110 corresponds to about 59° and FIG. 11 illustrates an example in which the angle formed by the center point P1 of the receiving coil 210 and the extended line of the magnetic average point of the transmitting coil 110 is smaller than 45°.

Experimental data representing an effect according to the extended length of the transmitting core 120 described above may be represented by the following Table 1.

TABLE 1

| Angle θ (deg) | Passive Lower Power Resonator Efficiency (Determined from S Parameters) |
|---|---|
| 59 | 8.13% |
| 53.4 | 9.12% |
| 48.5 | 9.55% |
| 44.2 | 10.47% |

The data in Table 1 is data obtained by using a transmitting coil of a single layer winding, wherein a thickness of a wire is 1.2 mm.

As illustrated in FIG. 10, in a case in which the angle is 59°, the transmitting coil 110 and the transmitting core 120 are in the state of having the same size, which indicates, for example, the state in which the length of the extension portion of the transmitting core is 0.

It may be appreciated from Table 1 that as the angle θ is reduced, the length of the transmitting core 120 becomes longer and the wireless power transferring capacity thereto improves, accordingly.

Figure 13:
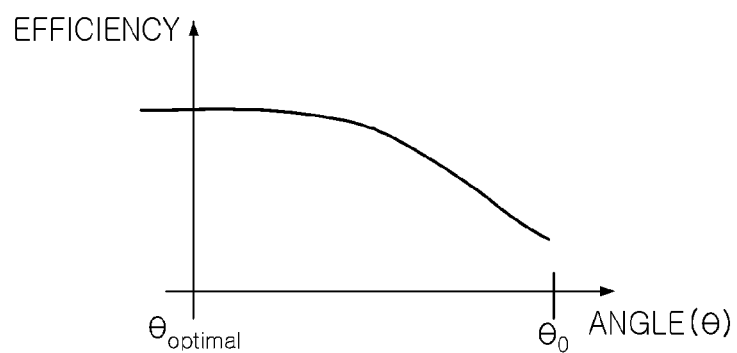
FIG. 13 is a graph illustrating an exemplary relationship between efficiency and an angle formed by an extended line of a magnetic average point and an intermediate point of a receiving coil.

A graph of FIG. 13 may be obtained by including the data such as in Table 1. FIG. 13 is a graph illustrating efficiency depending on the angle formed by the center point P1 of the receiving coil 210 and the extended line of the magnetic average point of the transmitting coil 110 and corresponding to the data described above. The angle θ° in FIG. 13 may be regarded as 59° of Table 1 and the $\theta_{optimal}$ may be about 44.2° of Table 1 or a value which is less than about 44.2° and larger than 0°.

As seen from the data, it may be seen that the efficiency is relatively high at an angle of approximately 45°. For example, it may be seen that as the extended length of the transmitting core 120 is increased, the effect is also proportionally increased up to the angle of approximately 45°, but the effect is similar in a case in which the transmitting core 120 is extended so that the angle is decreased to approximately 45° or less.

In detail, in a case in which the length of the transmitting core 120 is excessively long, there is a problem of the size of the wireless power transmitter 100 becoming inevitably increased. Therefore, the length of the transmitting core 120 may be more advantageous in a case in which it satisfies a condition of being as short as possible within the limits having a sufficient effect. Thus, it may be appreciated that the length of the transmitting core 120 may have a critical meaning as a maximum extended length when the angle is about 45°.

Figure 12:
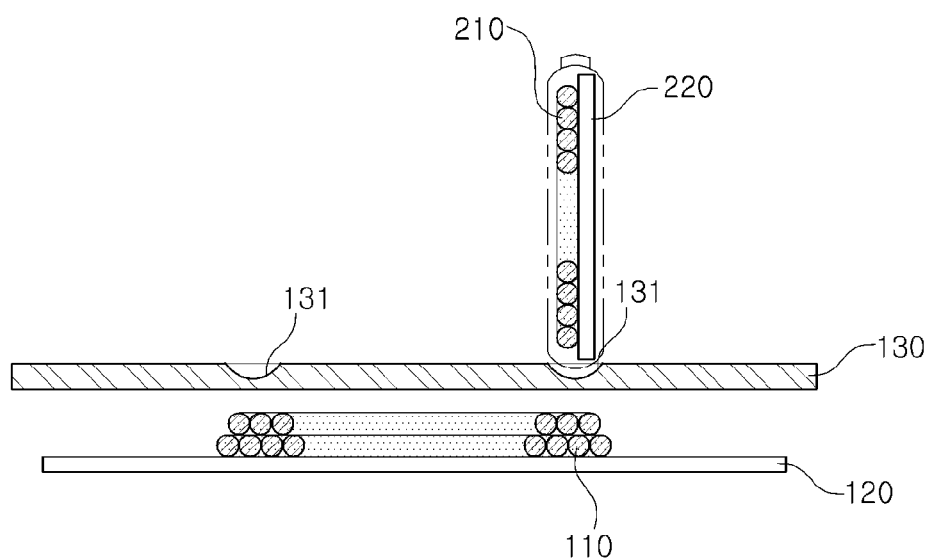

FIG. 12 illustrates an exemplary embodiment in which a marking portion is included in a housing.

FIG. 12 illustrates a portion of a housing 130, and the housing 130 may include a transmitting coil 110 and a transmitting core 120. The housing 130 may include a marking portion 131, and the marking portion 131 may mark a mounting position of a portable apparatus including the wireless power receiver.

For example, the marking portion 131 may include a predetermined structure or visual means capable of marking a position of the wireless power receiver 200. For example, the marking portion 131 may include a predetermined groove, mark, sign, or the like marked on a region of the housing corresponding to a position of the transmission coil so that the wireless power receiver 200 is positioned above the transmitting coil 110. For example, when the wireless power receiver 200 is a wearable device in the form of a watch, the housing 130 may include a predetermined intaglio shape which corresponds to a portion of a shape of the corresponding wearable equipment or at which the wearable equipment may be mounted on.

Figure 14:
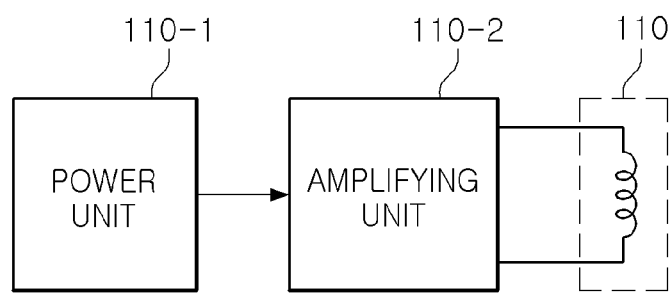
FIG. 14 is a circuit diagram illustrating an example of a wireless power transmitter according to an exemplary embodiment in the present disclosure.

FIG. 14 is a circuit diagram illustrating an example of a wireless power transmitter according to an exemplary embodiment in the present disclosure.

Referring to FIG. 14, the wireless power transmitter may include a power unit 110-1, an amplifier 110-2, and a transmitting coil 110. Although FIG. 14 illustrates a case in which the transmitting coil 110 is configured as a single coil, the transmitting coil 110 may include two or more coils, for example, a first coil to which a radio frequency power signal is applied from the amplifier 110-2, and a second coil disposed to be spaced apart from the first coil and transmitting power using a radio frequency induced from the first coil in an electromagnetic resonance mode.

The power unit 110-1 supplies power to the amplifier 110-2. The power unit 110-1 may include an analog to digital (AD) converter that converts alternating current power applied externally into direct current power, and a direct current (DC) to DC converter that varies a magnitude of the direct current power.

The amplifier 110-2 may amplify the power supplied from the power unit 110-1 and supply the amplified power to the transmitting coil 110. The amplifier 110-2 may include a power amplifier, an oscillator, and the like.

The transmitting coil 110 transmits power wirelessly. In this case, the transmitting coil 110 may transmit power in an electromagnetic resonance mode.

As set forth above, according to exemplary embodiments of the present disclosure, power may be efficiently supplied wirelessly, even in the case in which the transmitting coil and the receiving coil form various angles with respect to each other.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter electromagnetically coupleable to a receiving coil of a wireless power receiver to provide power wirelessly, the wireless power transmitter comprising:
   a transmitting core configured to be substantially planar; and
   a transmitting coil comprising a plurality of windings and configured to be disposed on a surface of the transmitting core,
   wherein the transmitting core is configured to extend beyond the transmitting coil in a planar direction by a length, wherein the length is less than a distance perpendicular from a virtual magnetic average line of the transmitting coil to a center point of the receiving coil.

2. The wireless power transmitter of claim 1, wherein the transmitting core is selectively sized according to at least one of a distance, an angle, or a magnetic distance between the transmitting coil and the receiving coil in response to the receiving coil being positioned above the transmitting coil at a predetermined angle with the transmitting coil.

3. The wireless power transmitter of claim 1, wherein the transmitting core comprises:
   a body portion corresponding to a size of the transmitting coil and having the transmitting coil fixed to the body portion; and
   an extension portion formed to extend from the body portion by a predetermined length equal to the length.

4. The wireless power transmitter of claim 3, wherein the predetermined length of the extension portion is established according to a shortest distance from the transmitting coil to the receiving coil.

5. The wireless power transmitter of claim 3, wherein the transmitting coil is wound in a plurality of layers, and
   the predetermined length of the extension portion is shorter than a distance from half of an overall height of the transmitting coil to a center point of the receiving coil in a direction perpendicular with respect to the transmitting coil.

6. The wireless power transmitter of claim 3, wherein the extension portion extends so that a distance from a virtual magnetic average line of the transmitting coil to a center point of the receiving coil in a direction perpendicular with respect to the virtual magnetic average line is substantially the same as a length from a center of a width of the transmitting coil to an end of the extension portion.

7. The wireless power transmitter of claim 1, wherein the transmitting core is formed so that a distance from a virtual magnetic average line of the transmitting coil to a center point of the receiving coil in a direction perpendicular with respect to the virtual magnetic average line substantially corresponds to a radial length from a center of the transmitting coil to an end of the transmitting core.

8. The wireless power transmitter of claim 1, wherein the transmitting coil is wound in a plurality of layers, and
   the transmitting core is formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

9. The wireless power transmitter of claim 1, wherein the transmitting core is formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

10. The wireless power transmitter of claim 1, wherein the transmitting core is formed so that an angle formed by a center point of the receiving coil and an extended line of a virtual magnetic average line of the transmitting coil is less than 45°.

11. The wireless power transmitter of claim 1, further comprising a housing comprising the transmitting coil and the transmitting core,
   wherein the housing further comprises a marking portion indicating a mounting position of a portable apparatus comprising the wireless power receiver.

12. The wireless power transmitter of claim 11, wherein the marking portion is marked so that the receiving coil is positioned above the transmitting coil.

13. The wireless power transmitter of claim 1, wherein the transmitting core is plate shaped and the transmitting coil is affixed to an upper surface of the transmitting core.

14. A wireless power transmitter electromagnetically coupleable to a receiving coil of a wireless power receiver to provide power wirelessly, the wireless power transmitter comprising:
   a transmitting core configured to be substantially planar; and
   a transmitting coil comprising a plurality of windings and being disposed on a surface of the transmitting core, wherein the transmitting core configured to extend beyond the transmitting coil in a planar direction, wherein the transmitting core comprises:
- a body portion corresponding to a size of the transmitting coil and having the transmitting coil fixed to the body portion; and
- an extension portion formed to extend from the body portion by a predetermined length, and wherein the predetermined length of the extension portion is shorter than a distance from a virtual magnetic average line of the transmitting coil to a center point of the receiving coil in a direction perpendicular with respect to the virtual magnetic average line.

15. A wireless charging system comprising:
- a wireless power transmitter comprising a transmitting coil and a transmitting core on which the transmitting coil is disposed; and
- a wireless power receiver comprising a receiving coil configured to form a predetermined nonzero angle with respect to the transmitting coil, wherein the transmitting core is selectively sized according to at least one of the angle, a distance, or a magnetic distance between the receiving coil and the transmitting coil, and wherein the transmitting core is configured to extend beyond the transmitting coil in a planar direction so that a distance perpendicular from a virtual magnetic average line of the transmitting coil to a center point of the receiving coil is substantially the same as a length from a center of a width of the transmitting coil to an end of the transmitting core.

16. The wireless charging system of claim 15, wherein the transmitting core comprises:
- a body portion corresponding to a size of the transmitting coil and having the transmitting coil fixed to the body portion; and
- an extension portion formed to extend from the body portion by a predetermined length.

17. The wireless charging system of claim 16, wherein the predetermined length of the extension portion is established according to a distance from the transmitting coil to the receiving coil.

18. The wireless charging system of claim 16, wherein the extension portion extends so that a distance from a virtual magnetic average line of the transmitting coil to a center point of the receiving coil in a direction perpendicular with respect to the virtual magnetic average line is substantially the same as a length from a center of the transmitting coil to an end of the extension portion.

19. The wireless charging system of claim 15, wherein the transmitting core is formed so that a distance from a virtual magnetic average line of the transmitting coil to a center point of the receiving coil in a direction perpendicular with respect to the virtual magnetic average line corresponds to a length from a center of the transmitting coil to an end of the transmitting core.

20. The wireless charging system of claim 15, wherein the transmitting coil is wound in a plurality of layers, and
the transmitting core is formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

21. The wireless charging system of claim 15, wherein the transmitting core is formed so that a length from a center of the transmitting coil to an end of the transmitting core is shorter than a distance from a virtual magnetic average line of the transmitting coil to a center point of the receiving coil in a direction perpendicular with respect to the virtual magnetic average line.

22. The wireless charging system of claim 15, wherein the transmitting core is formed so that an angle formed by a center point of the receiving coil and an extended line of a virtual magnetic average line of the transmitting coil is less than 45°.

23. The wireless charging system of claim 15, wherein the transmitting coil and receiving coil are disposed substantially transverse one to another.

* * * * *